(12) United States Patent
Miyoshi et al.

(10) Patent No.: US 9,695,929 B2
(45) Date of Patent: Jul. 4, 2017

(54) SPEED CHANGE DEVICE (71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Katsunori Miyoshi, Anjo (JP); Kenji Sasaki, Anjo (JP); Keisuke Omuro, Toyota (JP); Koichi Okuda, Toyota (JP); Masafumi Yamamoto, Nagakute (JP); Keita Imai, Seto (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/124,572

(22) PCT Filed: Mar. 2, 2015

(86) PCT No.: PCT/JP2015/056064
§ 371 (c)(1),
(2) Date: Sep. 8, 2016

(87) PCT Pub. No.: WO2015/146497
PCT Pub. Date: Oct. 1, 2015

(65) Prior Publication Data
US 2017/0016528 A1 Jan. 19, 2017

(30) Foreign Application Priority Data

Mar. 24, 2014 (JP) .................................. 2014-060140

(51) Int. Cl.
F16H 57/04 (2010.01)
F16H 57/00 (2012.01)
(Continued)

(52) U.S. Cl.
CPC .......... *F16H 57/0484* (2013.01); *F16D 1/06* (2013.01); *F16H 57/0025* (2013.01);
(Continued)

(58) Field of Classification Search
None
See application file for complete search history.

(56) References Cited

U.S. PATENT DOCUMENTS 5,910,063 A 6/1999 Kato
8,523,725 B2 * 9/2013 Torii ..................... F16H 57/082
475/159
(Continued)

FOREIGN PATENT DOCUMENTS

JP H10-68461 A 3/1998
JP 2007-270865 A 10/2007

OTHER PUBLICATIONS

May 19, 2015 International Search Report issued in Patent Application No. PCT/JP2015/056064.

*Primary Examiner* — Colby M Hansen
(74) *Attorney, Agent, or Firm* — Oliff PLC (57) ABSTRACT

A speed change device includes a power transfer shaft, a tubular shaft member, and a planetary gear mechanism that has a carrier. An in-shaft oil passage is formed in the power transfer shaft. A radially inner portion of the carrier and the tubular shaft member are splined to each other. An inside opening portion of a guide oil passage is formed in a non-spline portion of the radially inner portion. A target race member of a thrust bearing is disposed so as to abut against the carrier. The radially innermost position of the non-spline portion is on the radially outer side of the radially outermost position of a spline engagement portion. An oil receiving portion is formed by the tubular shaft member, the non-spline portion, and the target race member.

11 Claims, 5 Drawing Sheets (51) Int. Cl.
*F16D 1/06* (2006.01)
*F16H 57/08* (2006.01)
*B60K 6/547* (2007.10)
*B60K 6/442* (2007.10)
*B60K 6/365* (2007.10)

(52) U.S. Cl.
CPC ........... F16H 57/04 (2013.01); F16H 57/043 (2013.01); F16H 57/0426 (2013.01); F16H 57/0471 (2013.01); F16H 57/0479 (2013.01); F16H 57/08 (2013.01); F16H 57/082 (2013.01); *B60K 6/365* (2013.01); *B60K 6/442* (2013.01); *B60K 6/547* (2013.01); *B60Y 2200/92* (2013.01); *B60Y 2306/03* (2013.01); *B60Y 2400/73* (2013.01); *Y10S 903/945* (2013.01)

(56) References Cited

U.S. PATENT DOCUMENTS

| | | | | |
|---|---|---|---|---|
| 2010/0151986 A1* | 6/2010 | Burgman | ............ | F16H 57/0479 |
| | | | | 475/348 |
| 2010/0160104 A1* | 6/2010 | Dinter | ................. | F16H 24/0427 |
| | | | | 475/159 |

* cited by examiner

Prior Art

SPEED CHANGE DEVICE

I. TECHNICAL FIELD

Embodiments of the present disclosure relate to a speed change device that includes a planetary gear mechanism that has a carrier.

BACKGROUND ART

Figure 6:
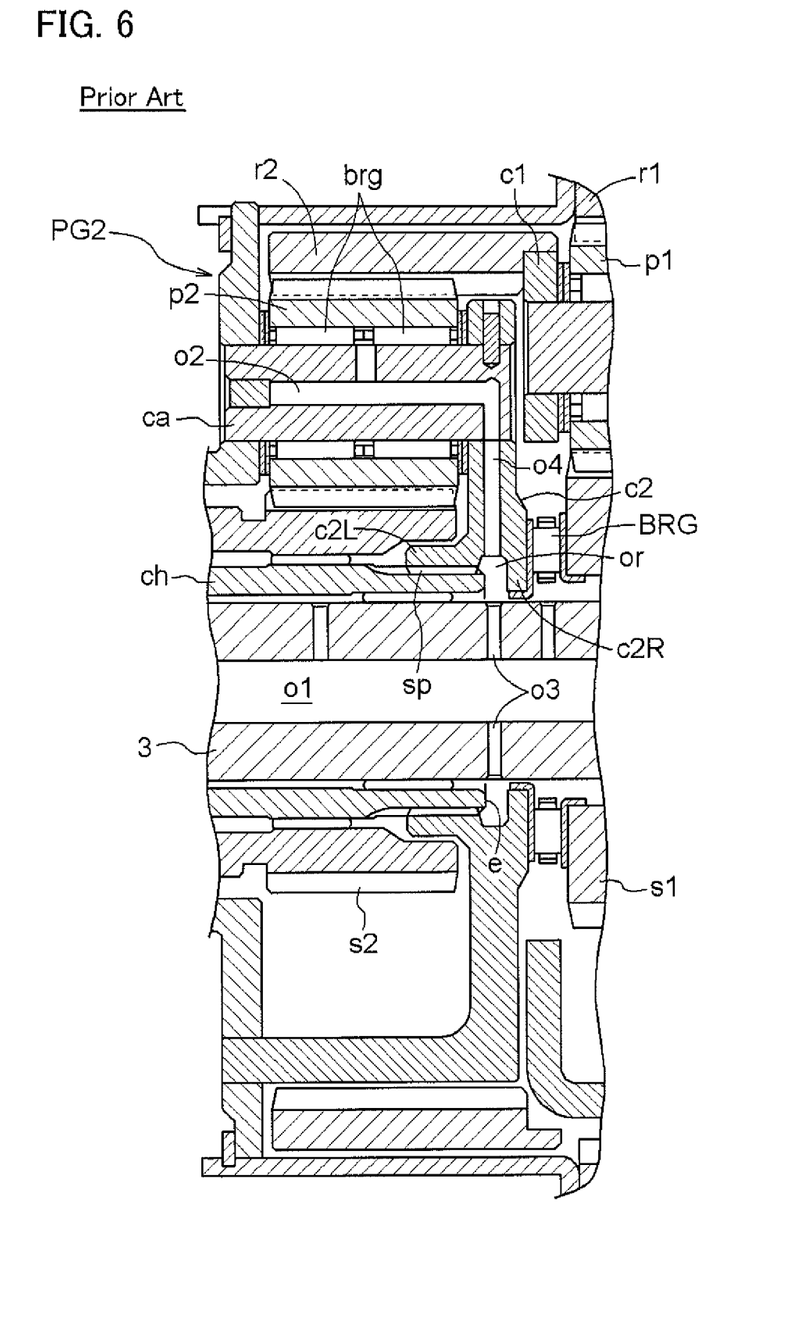
FIG. 6 is a partial sectional view of a speed change device according to the related art.

A device described in Japanese Patent Application Publication No. 2007-270865 (JP 2007-270865 A) (Patent Document 1) is known as an example of the speed change device described above. The structure disclosed in Patent Document 1 will be described below with reference to FIG. 6 of the present application which is a reprint of FIG. 3 of Patent Document 1. As illustrated in FIG. 6, the speed change device according to Patent Document 1 includes a planetary gear mechanism disposed coaxially with a power transfer shaft, and the planetary gear mechanism includes a carrier that rotatably supports a pinion. The speed change device includes a structure for leading oil supplied through the inside of the power transfer shaft to a carrier shaft to lubricate a support portion of the carrier shaft for the pinion. An oil receiving portion is provided at a portion of the radially inner portion of the carrier, which opposes an in-shaft oil passage formed in the power transfer shaft, and oil is supplied from the oil receiving portion, achieving good lubrication of the support portion for the pinion.

In the device according to Patent Document 1, the oil receiving portion is formed in a recessed shape between a spline engagement portion on the carrier side for engagement with a tubular shaft member disposed coaxially with the power transfer shaft and a race abutment portion that abuts against a thrust bearing. In the device according to Patent Document 1 configured in this way, in order to secure the depth of the oil receiving portion in a recessed shape, the race abutment portion is formed to extend in the radial direction to the vicinity of the outer peripheral surface of the power transfer shaft. As a result, the race abutment portion of the carrier is configured to project toward the radially inner side of the spline engagement portion.

With such a configuration, the race abutment portion physically obstructs formation of a spline engagement portion for engagement with the tubular shaft member on the carrier, and broaching may not be applied. Therefore, it is necessary to perform shaping, which does not provide a high productivity. Meanwhile, simply shortening the projection length of the race abutment portion toward the radially inner side makes the oil receiving portion shallower. Therefore, a sufficient amount of oil may not be received, as a result of which it is difficult to secure good lubrication of the support portion for the pinion.

RELATED-ART DOCUMENTS

Patent Documents

[Patent Document 1] Japanese Patent Application Publication No. 2007-270865 (JP 2007-270865 A)

II. SUMMARY

It is therefore desirable to provide a speed change device that can improve productivity compared to the related art while securing good lubrication of a support portion of a carrier for a pinion.

Means for Solving the Problem

The present disclosure provides a speed change device including a power transfer shaft, a tubular shaft member disposed on a radially outer side of the power transfer shaft coaxially with the power transfer shaft, and a planetary gear mechanism having a carrier that rotatably supports a pinion and disposed on a radially outer side of the tubular shaft member coaxially with the tubular shaft member, in which:

an in-shaft oil passage that communicates with a supply-side opening portion that opens in an outer peripheral surface of the power transfer shaft is formed in the power transfer shaft;

a radially inner portion of the carrier, which faces toward a radially inner side and is provided over a predetermined axial range, is disposed so as to oppose the supply-side opening portion, and a part of the radially inner portion and a part of an outer peripheral surface of the tubular shaft member are coupled to each other by a spline engagement portion;

an inside opening portion of a guide oil passage that leads oil supplied from the supply-side opening portion to a support portion of the carrier for the pinion is formed in a non-spline portion which is a portion of the radially inner portion excluding the spline engagement portion;

a thrust bearing that receives an axial load is disposed on an opposite side of the inside opening portion from the spline engagement portion in an axial direction, and a target race member which is one of race members of the thrust bearing abuts against the carrier;

a radially innermost position of the non-spline portion is on a radially outer side of a radially outermost position of the spline engagement portion; and an oil receiving portion in a groove shape that extends in a circumferential direction is formed by the tubular shaft member, the non-spline portion, and the target race member.

With the configuration, oil supplied from the supply-side opening portion of the power transfer shaft through the in-shaft oil passage can be received by the oil receiving portion which is formed utilizing a part (the non-spline portion) of the radially inner portion of the carrier, and the oil can be led to the support portion of the carrier for the pinion.

Since the radially innermost position of the non-spline portion of the carrier is on the radially outer side of the radially outermost position of the spline engagement portion, there is caused no problem due to interference with the non-spline portion, and the spline engagement portion can be formed by broaching. Hence, productivity can be significantly improved compared to a case where it is necessary to perform shaping as in the related art.

In addition, even in the case where the non-spline portion is positioned on the radially outer side of the spline engagement portion, oil supplied from the supply-side opening portion can be sufficiently received by forming the oil receiving portion utilizing the target race member which is one of the race members of the thrust bearing. Hence, the support portion of the carrier for the pinion can be securely lubricated well.

DESCRIPTION

A speed change device according to an embodiment will be described with reference to the drawings. In the embodiment, a speed change device 1 is incorporated in a vehicle drive device 100. The vehicle drive device 100 according to the embodiment is a vehicle drive device (hybrid vehicle drive device) configured to drive a vehicle (hybrid vehicle) that includes both an internal combustion engine E and a rotary electric machine MG as drive force sources for wheels W of the vehicle. In the embodiment, the vehicle drive device 100 is constituted as a drive device for a two-motor series/parallel type hybrid vehicle.

The term "rotary electric machine MG" is used to comprehend a first rotary electric machine MG1 and a second rotary electric machine MG2. In addition, the term "rotary electric machine" includes any of a motor (electric motor), a generator (electric generator), and a motor generator that functions both as a motor and as a generator as necessary.

In the following description, unless specifically differentiated, the "axial direction L", the "radial direction", and the "circumferential direction" are defined with reference to the rotational axis of an input shaft I and an intermediate shaft M disposed coaxially with each other. Directions for respective members indicate directions with that member assembled to the vehicle drive device 100. Terms related to the direction, the position, etc, of each member may allow a difference due to a manufacturing error.

Figure 1:
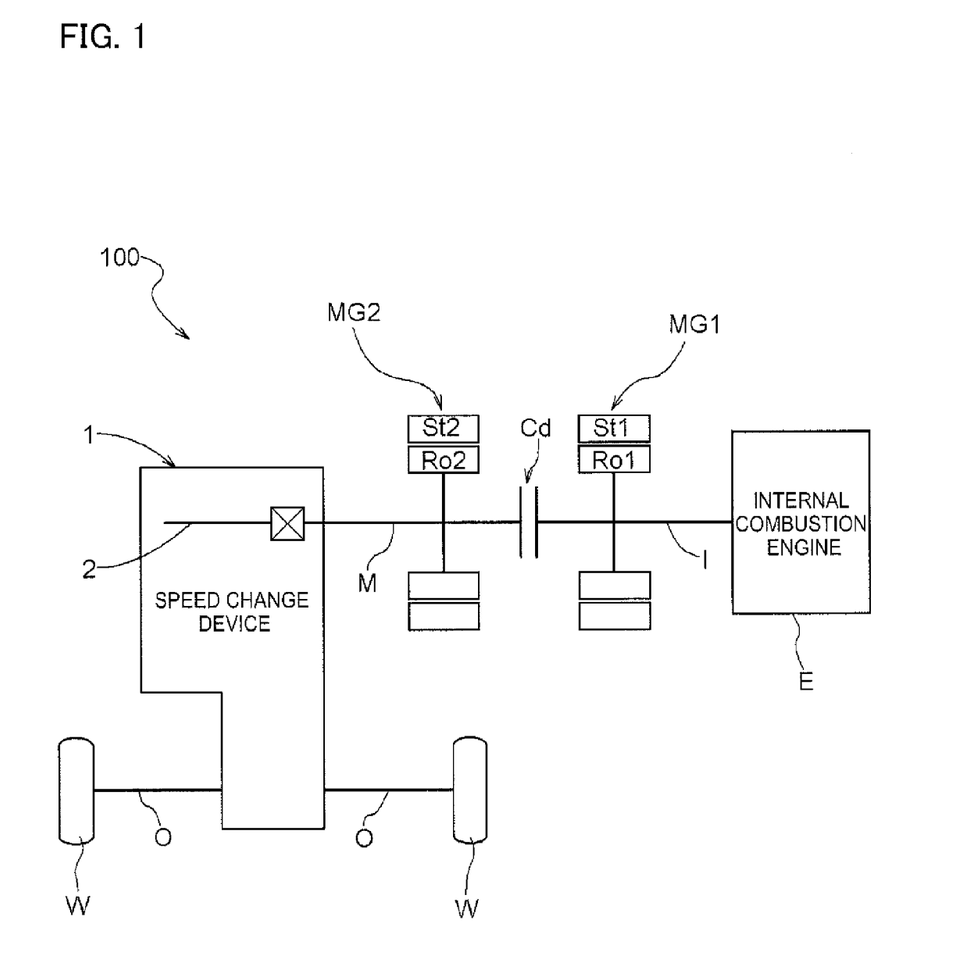
FIG. 1 is a schematic diagram illustrating a schematic configuration of a vehicle drive device that includes a speed change device.

As illustrated in FIG. 1, the vehicle drive device 100 includes the input shaft I which is drivably coupled to the internal combustion engine E, the first rotary electric machine MG1, a disengagement clutch Cd, the second rotary electric machine MG2, the intermediate shaft M, the speed change device 1, and an output shaft O drivably coupled to the wheels W. The first rotary electric machine MG1, the disengagement clutch Cd, the second rotary electric machine MG2, and the speed change device 1 are provided in a power transfer path that connects between the input shaft I and the output shaft O in the order in which they are mentioned from the side of the input shaft I. Such components are housed in a case (not illustrated).

The term "drivably coupled" means a state in which two rotary elements are coupled to each other in such a manner that enables transfer of a drive force (a synonym for torque). The concept includes a state in which the two rotary elements are coupled so as to rotate together with each other, and a state in which the two rotary elements are coupled via one or more transmission members in such a manner that enables transfer of a drive force. Such transmission members may include various members that transfer rotation at an equal speed or a changed speed (such as a shaft, a gear mechanism, and a belt), and include engagement devices that selectively transfer rotation and a drive force (such as a friction engagement device and a meshing-type engagement device).

The internal combustion engine E is a motor (such as a gasoline engine or a diesel engine) driven by combusting fuel inside the engine to take out power. In the embodiment, an internal combustion engine output shaft (such as a crankshaft) which is an output shaft of the internal combustion engine E is drivably coupled to the input shaft I which serves as an input member. In the illustrated example, the internal combustion engine output shaft and the input shaft I are directly coupled to each other. However, the internal combustion engine output shaft may be drivably coupled to the input shaft I via another member such as a damper.

The first rotary electric machine MG1 has a first stator St1 fixed to a case and a first rotor Ro1 rotatably supported on the radially inner side of the first stator St1. The first rotor Ro1 is drivably coupled so as to rotate together with the input shaft I. The first rotary electric machine MG1 is electrically connected to an electricity accumulation device (such as a battery and a capacitor). The first rotary electric machine MG1 mainly functions as a generator (electric generator) that is supplied with power to generate electric power. That is, the first rotary electric machine MG1 supplies electric power generated using torque of the internal combustion engine E to the electricity accumulation device to accumulate the electric power. The first rotary electric machine MG1 occasionally functions as a motor in accordance with the travel state of the vehicle.

The disengagement clutch Cd is interposed between the first rotary electric machine MG1 and the second rotary electric machine MG2. The disengagement clutch Cd selectively drivably couples the internal combustion engine E and the first rotary electric machine MG1 and the second rotary electric machine MG2 to each other. In the embodiment, the disengagement clutch Cd is constituted as a hydraulically driven friction engagement device. The disengagement clutch Cd disengages the internal combustion engine E and the first rotary electric machine MG1 from the wheels W when the disengagement clutch Cd is disengaged.

The second rotary electric machine MG2 has a second stator St2 fixed to the case and a second rotor Ro2 rotatably supported on the radially inner side of the second stator St2. The second rotor Ro2 is drivably coupled so as to rotate together with the intermediate shaft M. The second rotary electric machine MG2 is electrically connected to an electricity accumulation device (such as a battery and a capacitor). The second rotary electric machine MG2 mainly functions as a motor (electric motor) that is supplied with electric power to generate power. That is, the second rotary electric machine MG2 receives supply of electric power accumulated in the electricity accumulation device to perform power running. The second rotary electric machine MG2 occasionally functions as a generator in accordance with the travel state of the vehicle.

The intermediate shaft M is drivably coupled to the speed change device 1. In the embodiment, the speed change device 1 is configured to include an automatic speed change mechanism that switchably provides a plurality of shift speeds with different speed ratios, a counter gear mechanism, and a differential gear mechanism. The speed change device 1 transfers rotation and torque input to the intermediate shaft M to a pair of left and right output shafts O (an example of an output member) and the wheels W with the speed changed in accordance with a speed ratio at each timing and with torque converted. This allows the vehicle drive device 100 to transfer torque of at least one of the internal combustion engine E and the rotary electric machine MG to the wheels W to drive the vehicle.

The vehicle drive device 100 includes an oil pump (not illustrated) driven by rotation of the input shaft I or the intermediate shaft M. The oil pump suctions oil stored in an oil pan and discharges the oil at a predetermined pressure to supply the oil to various components in the vehicle drive device 100.

Figure 2:
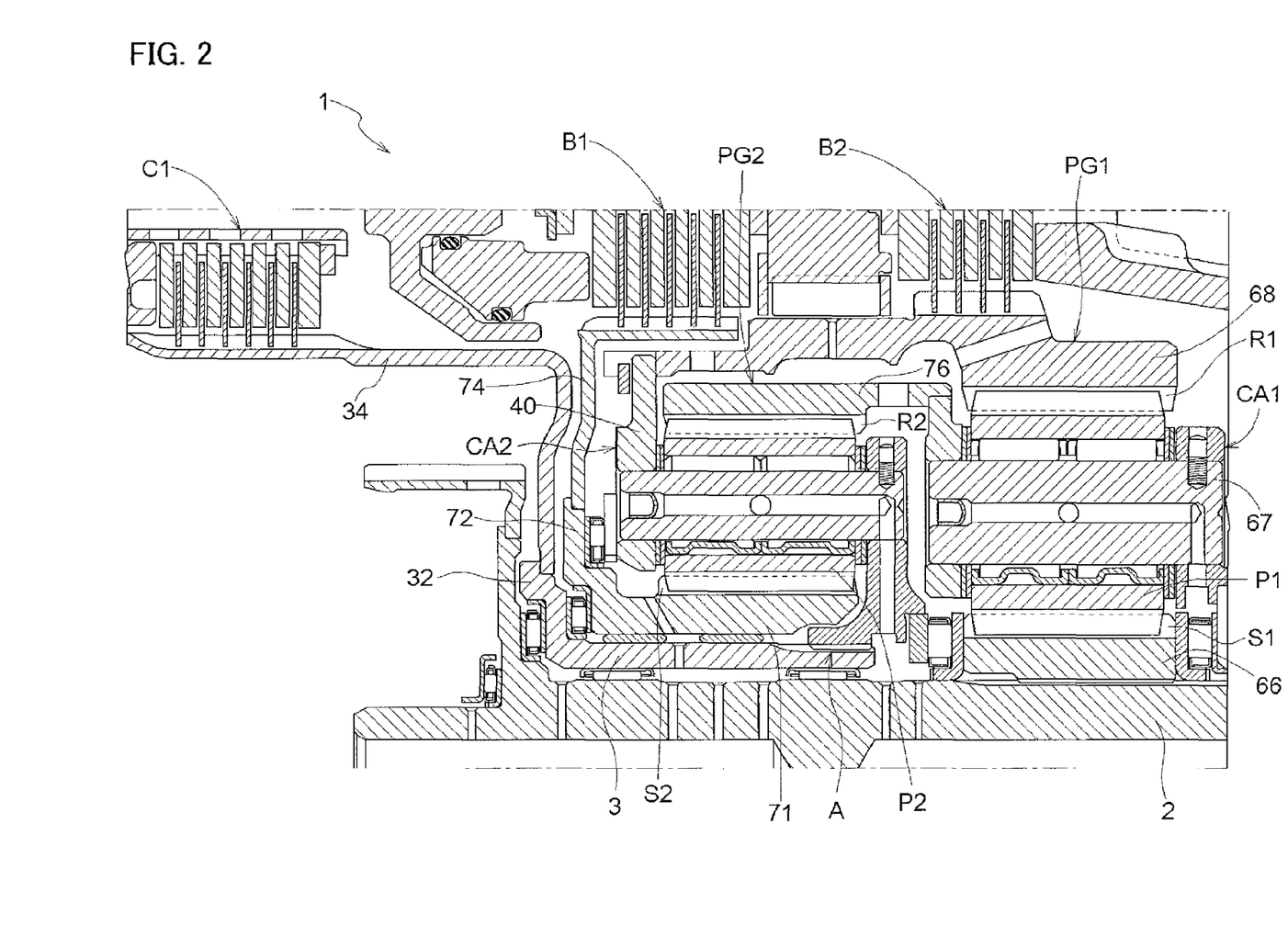
FIG. 2 is a partial sectional view of the speed change device.

As illustrated in FIGS. 1 and 2, the automatic speed change mechanism which constitutes the speed change device 1 includes a power transfer shaft 2 disposed side by side and coaxially with the intermediate shaft M. As is well known, in order to switchably establish the plurality of shift speeds, the speed change device 1 (automatic speed change mechanism) includes a plurality of planetary gear mechanisms and a plurality of friction engagement devices for shifting. In the example, as illustrated in FIG. 2, the speed change device 1 (automatic speed change mechanism) includes a first planetary gear mechanism PG1 and a second planetary gear mechanism PG2, and a first clutch C1, a first brake B1, and a second brake B2, for example. As a matter of course, the speed change device 1 may include other planetary gear mechanisms and friction engagement devices for shifting, and may include other elements such as a one-way clutch.

The first planetary gear mechanism PG1 has three rotary elements, namely a first sun gear S1, a first carrier CA1, and a first ring gear R1. The first planetary gear mechanism PG1 has the first carrier CA1 which supports a plurality of first pinions P1, and the first sun gear S1 and the first ring gear R1 which are meshed with the first pinions P1. In the embodiment, the first planetary gear mechanism PG1 is constituted of a planetary gear mechanism of a single pinion type.

The second planetary gear mechanism PG2 has three rotary elements, namely a second sun gear S2, a second carrier CA2, and a second ring gear R2. The second planetary gear mechanism PG2 has the second carrier CA2 which supports a plurality of second pinions P2, and the second sun gear S2 and the second ring gear R2 which are meshed with the second pinions P2. In the embodiment, the second planetary gear mechanism PG2 is constituted of a planetary gear mechanism of a single pinion type.

The first planetary gear mechanism PG1 and the second planetary gear mechanism PG2 are disposed coaxially with the power transfer shaft 2. In addition, the first planetary gear mechanism PG1 and the second planetary gear mechanism PG2 are disposed on the radially outer side of the power transfer shaft 2. In the embodiment, the first planetary gear mechanism PG1 and the second planetary gear mechanism PG2 are disposed side by side with each other in the axial direction L in generally the same region in the radial direction. In the example, the second planetary gear mechanism PG2 is disposed on the opposite side of the first planetary gear mechanism PG1 from the rotary electric machine MG.

In the embodiment, the first clutch C1, the first brake B1, and the second brake B2 are each constituted as a hydraulically driven friction engagement device. The friction engagement devices are disposed coaxially with the power transfer shaft 2. In addition, the friction engagement devices are disposed on the radially outer side of the first planetary gear mechanism PG1 and the second planetary gear mechanism PG2. In the embodiment, the friction engagement devices are disposed side by side with each other in the axial direction L in generally the same region in the radial direction. In the example, the second brake B2, the first brake B1, and the first clutch C1 are disposed in the order in which they are mentioned from the rotary electric machine MG side.

As illustrated in FIG. 2, a first sun gear forming member 66 on which the first sun gear S1 is formed is coupled so as to rotate together with the power transfer shaft 2. A first carrier case 67 that constitutes the first carrier CA1 is coupled so as to rotate together with a second ring gear forming member 76 on which the second ring gear R2 is formed. A first ring gear forming member 68 on which the first ring gear R1 is formed is coupled so as to rotate together with a second carrier case 40 that constitutes the second carrier CA2.

Further, the second carrier case 40 is coupled by a spline engagement portion A so as to rotate together with a tubular shaft member 3 disposed on the radially outer side of the power transfer shaft 2 coaxially with the power transfer shaft 2. The tubular shaft member 3 has an inside diameter that is larger than the outside diameter of the power transfer shaft 2 and is externally placed on the power transfer shaft 2 so as to surround the power transfer shaft 2. The tubular shaft member 3 has a hub coupling portion 32 provided at an end portion on the side opposite to the first planetary gear mechanism PG1 side in the axial direction L. The tubular shaft member 3 is coupled by the hub coupling portion 32 so as to rotate together with a clutch hub 34 that slidably supports the friction plates of the first clutch C1 from the radially inner side.

A second sun gear forming member 71 on which the second sun gear S2 is formed is disposed on the radially outer side of the tubular shaft member 3 coaxially with the tubular shaft member 3. The second sun gear forming member 71 has an inside diameter that is larger than the outside diameter of the tubular shaft member 3 and is externally placed on the tubular shaft member 3 so as to surround the tubular shaft member 3. The second sun gear forming member 71 has a hub coupling portion 72 provided at an end portion on the side opposite to the first planetary gear mechanism PG1 side in the axial direction L. The second sun gear forming member 71 is coupled by the hub coupling portion 72 so as to rotate together with a brake hub 74 that slidably supports the friction plates of the first brake B1 from the radially inner side. The friction plates of the second brake B2 are slidably supported by the first ring gear forming member 68 from the radially inner side.

Oil discharged from the oil pump is regulated to a desired hydraulic pressure in a hydraulic control device (not illustrated), and supplied to control the engagement state of the disengagement clutch Cd, the first clutch C1, the first brake B1, the second brake B2, and so forth. The "engagement state" includes a directly engaged state, a slip engagement state, and a disengaged state, for example. In addition, oil discharged from the oil pump is supplied for lubrication, cooling, etc. of various components of the device. Hereinafter, focus will be placed on a lubricating structure for a pinion bearing 58 (see FIG. 3) disposed between the second pinion P2 supported by the second carrier CA2 of the second planetary gear mechanism PG2 and a carrier shaft 49 that supports the second pinion P2, and the lubricating structure will be described. In the embodiment, the second planetary gear mechanism PG2, the second carrier CA2, and the second pinion P2 correspond to the "planetary gear mechanism", the "carrier", and the "pinion", respectively.

Figure 3:
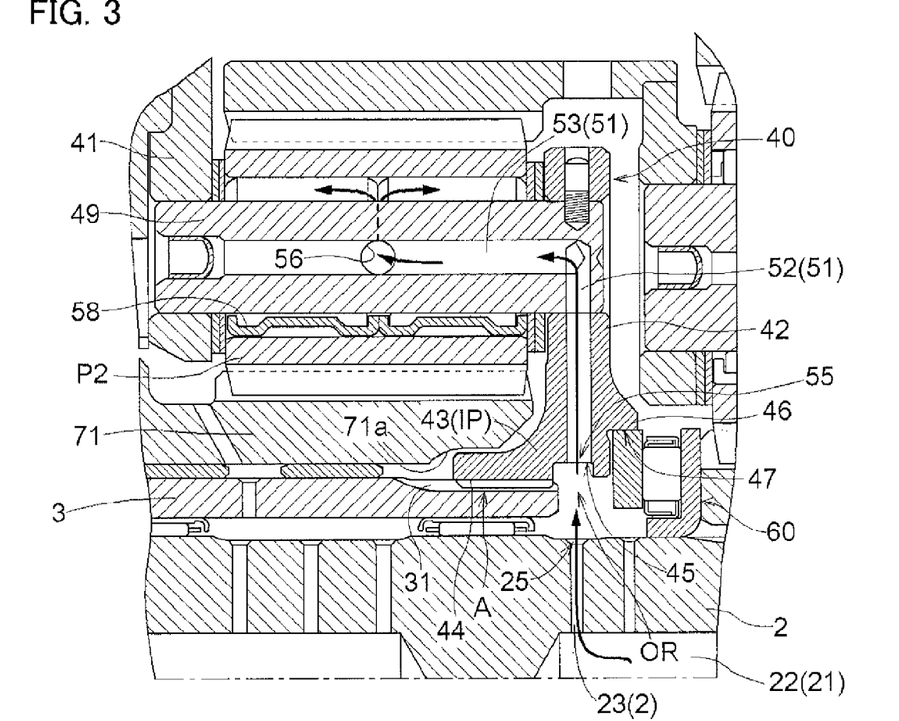
FIG. 3 is a partial enlarged view of FIG. 2.

As illustrated in FIG. 3, lubrication of the pinion bearing 58 is generally achieved by supplying oil supplied to the second carrier CA2 from the radially inner side via an in-carrier oil passage 51 formed in the second carrier CA2. In the embodiment, an in-shaft oil passage 21 is formed inside the power transfer shaft 2. The in-shaft oil passage 21 includes an axial oil passage 22 that extends linearly along the axial direction L and a radial oil passage 23 that extends linearly along the radial direction. In the embodiment, a plurality of radial oil passages 23 that extend in the radial direction from a predetermined position of the axial oil passage 22 are formed. At least one of the plurality of radial oil passages 23 opens in the outer peripheral surface of the power transfer shaft 2 in a region between the first planetary gear mechanism PG1 and the second planetary gear mechanism PG2 in the axial direction L. In the embodiment, the opening portion is referred to as a "supply-side opening portion 25". That is, the in-shaft oil passage 21 includes the radial oil passages 23 (radial oil passages for supply) which communicate with both the axial oil passage 22 and the supply-side opening portion 25.

In the embodiment, the second planetary gear mechanism PG2 is disposed on the radially outer side of the power transfer shaft 2 and the tubular shaft member 3. The second carrier CA2 which constitutes the second planetary gear mechanism PG2 includes the plurality of second pinions P2, a plurality of carrier shafts 49 that rotatably support the second pinions P2, and the second carrier case 40 which rotatably supports the plurality of carrier shafts 49. The second pinions P2 are provided so as to be meshed with both the second sun gear S2 and the second ring gear R2. The second pinion P2 is supported in the radial direction by the carrier shaft 49 so as to be rotatable via the pinion bearing 58. In other words, the pinion bearing 58 is disposed at a support portion of the carrier shaft 49 for the second pinion P2 in the second carrier case 40.

As illustrated in FIGS. 2 and 3, the second carrier case 40 includes: a first support plate portion 41 that supports the second pinions P2 on one side (on the first clutch C1 side) in the axial direction L; and a second support plate portion 42 that supports the second pinion P2 on the other side (on the first planetary gear mechanism PG1 side) in the axial direction L. The first support plate portion 41 is disposed at a position that overlaps the friction plates of the first brake B1 as seen in the radial direction. The first support plate portion 41 is coupled to the first ring gear forming member 68 on the radially inner side of the friction plates of the first brake B1. The second support plate portion 42 is disposed at a position that overlaps the supply-side opening portion 25 of the in-shaft oil passage 21 (radial oil passage 23) as seen in the radial direction.

With regard to the arrangement of two members, the phrase "overlap each other as seen in a certain direction" means that when an imaginary line that is parallel to the viewing direction is moved in directions that are orthogonal to the imaginary line, the imaginary line crosses both of the two members in at least some region.

As illustrated in FIG. 3, the second support plate portion 42 has an axially extending portion 43 provided at an end portion on the radially inner side to extend in the axial direction L. The axially extending portion 43 is formed in the shape of a tube (in the example, a cylinder) that extends over a predetermined axial range. The axially extending portion 43 is disposed so as to extend toward the first support plate portion 41 (toward the side opposite to the first planetary gear mechanism PG1 side) with respect to a plate-like portion of the second support plate portion 42 that extends in the radial direction. In the embodiment, a portion that forms the inner peripheral surface of the axially extending portion 43 which constitutes a part of the second support plate portion 42 is a radially inner portion IP of the second carrier CA2 that faces toward the radially inner side, and corresponds to the "radially inner portion".

The axially extending portion 43 is disposed on the radially outer side of the tubular shaft member 3 and on the radially inner side of the second sun gear forming member 71. The distal end portion of the axially extending portion 43 is disposed so as to have a portion that overlaps both the tubular shaft member 3 and the second sun gear forming member 71 as seen in the radial direction. In the embodiment, in addition, the distal end portion of the axially extending portion 43 is accommodated in a space defined by a dented portion 71a formed in the second sun gear forming member 71. The axially extending portion 43 is disposed so as to have a portion that overlaps the second sun gear forming member 71 as seen in the axial direction L.

A part of the inner peripheral surface of the axially extending portion 43 and a part of the outer peripheral surface of the tubular shaft member 3 are coupled to each other by the spline engagement portion A. In the embodiment, spline teeth 44 are formed on a portion of the axially extending portion 43 which extends toward the first support plate portion 41 with respect to a circumferential groove portion 45 to be discussed later, and spline teeth 31 are formed at an end portion of the tubular shaft member 3 on the first planetary gear mechanism PG1 side. The spline teeth 44 of the axially extending portion 43 and the spline teeth 31 of the tubular shaft member 3 are disposed with their end portions on the first planetary gear mechanism PG1 side generally aligned with each other. The axial length of the spline teeth 31 of the tubular shaft member 3 is set to be longer than the axial length of the spline teeth 44 of the axially extending portion 43. The spline engagement portion A is constituted of the spline teeth 31 of the tubular shaft member 3 and the spline teeth 44 of the axially extending portion 43 which are meshed with each other. The spline teeth 44 which are formed on the inner peripheral surface of the axially extending portion 43 constitute a spline portion SP that involves the spline engagement portion A, of the radially inner portion IP of the second carrier CA2 (see FIG. 4).

Figure 4:
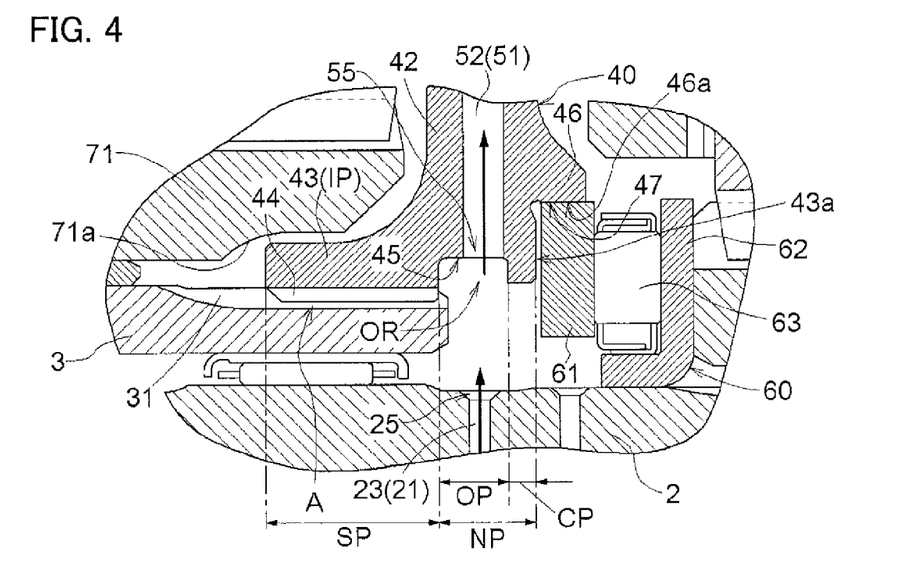
FIG. 4 is a partial enlarged view of FIG. 3.

As illustrated in FIG. 4, the axially extending portion 43 which constitutes the radially inner portion IP of the second carrier CA2 is disposed so as to oppose the supply-side opening portion 25 which is formed in the outer peripheral surface of the power transfer shaft 2. In the embodiment, a non-spline portion NP, which is a portion of the axially extending portion 43 (radially inner portion IP) excluding the spline teeth 44 (a portion that does not involve the spline engagement portion A), is disposed so as to oppose the supply-side opening portion 25 in the radial direction. In the embodiment, the tubular shaft member 3 is not interposed between the power transfer shaft 2 and the axially extending portion 43 at a position in the axial direction L at which the supply-side opening portion 25 is formed. In other words, the non-spline portion NP of the axially extending portion 43 is disposed so as to directly oppose the supply-side opening portion 25 without the tubular shaft member 3 interposed between the supply-side opening portion 25 and the non-spline portion NP.

In addition, the circumferential groove portion 45 which is defined in a recessed shape and which extends in the circumferential direction is formed on the inner peripheral side of the axially extending portion 43 at a position in the axial direction L at which the supply-side opening portion 25 is formed. In the embodiment, the circumferential groove portion 45 is defined and formed in a recessed shape by a bottom surface that faces toward the radially inner side and a pair of side surfaces that extend along the radial direction from the bottom surface and that oppose each other in the axial direction L in parallel with each other. The circumferential groove portion 45 is formed in a rectangular cross-sectional shape. The circumferential groove portion 45 is formed as a groove portion that is continuous in the circumferential direction. The circumferential groove portion 45 is formed as a relatively shallow groove portion. The circumferential groove portion 45 is constituted to have a depth that is smaller than the thickness of an end portion of the axially extending portion 43 on the first clutch C1 side in the axial direction L, for example. An inside opening portion 55 that is an opening portion on the radially inner side of a radial oil passage 52 that constitutes the in-carrier oil passage 51 to be discussed later is formed in the bottom surface of the circumferential groove portion 45. The circumferential groove portion 45 in which the inside opening portion 55 is formed constitutes an opening forming portion OP, of the non-spline portion NP of the axially extending portion 43 (radially inner portion IP).

A race opposing portion CP is provided on the opposite side of the opening forming portion OP from the spline portion SP side in the axial direction L. In the embodiment, a thrust bearing 60 that receives an axial load is disposed on the opposite side of the second carrier case 40 from the spline engagement portion A so as to abut against the second carrier case 40. In the embodiment, the second carrier case 40 has an annular protruding portion 46 provided at a position slightly deviating toward the radially outer side of the inner peripheral surface of the axially extending portion 43 to project toward the side (toward the first planetary gear mechanism PG1 side) opposite to the spline engagement portion A side in the axial direction L. Because of the presence of the protruding portion 46, the second carrier case 40 has a stepped portion 47 that is stepped toward the thrust bearing 60 and the radially inner side. That is, the second carrier case 40 has the stepped portion 47 which includes an axially opposing surface 43a that faces toward the thrust bearing 60 in the axial direction L and an inner peripheral surface 46a that faces toward the radially inner side. The thrust bearing 60 is disposed utilizing the stepped portion 47.

As illustrated in FIG. 4, the thrust bearing 60 may have a pair of a first race member 61 and a second race member 62, and a plurality of rolling elements 63 held between the first race member 61 and the second race member 62. The first race member 61 is press-fitted with the inner peripheral surface 46a of the protruding portion 46 in the state of opposing the axial end surface (axially opposing surface 43a) of the axially extending portion 43 in the axial direction L via a minute clearance. The first race member 61 is fixed to the stepped portion 47 with the outer peripheral surface of the first race member 61 and the inner peripheral surface 46a of the protruding portion 46 (stepped portion 47) abutting against each other, and attached to the second carrier CA2. The first race member 61 is formed in a rectangular sectional shape using a flat plate member (thick plate member). There is a remarkable difference between such a configuration of the first race member 61 and a configuration in which the second race member 62 which is disposed in abutment with the first sun gear forming member 66 is bent and formed in an L-shape in section using a thin plate. In the embodiment, the first race member 61 corresponds to the "target race member". As the rolling elements 63, "rollers", "balls", or the like that are generally widely used may be used as appropriate.

Of the non-spline portion NP of the axially extending portion 43 (radially inner portion IP), the race opposing portion CP which is disposed facing the first race member 61 also serves to define the circumferential groove portion 45 discussed above. That is, a surface of the race opposing portion CP that faces toward the side opposite to the thrust bearing 60 side serves as one of the pair of side surfaces which define and form the circumferential groove portion 45. In this way, the race opposing portion CP is formed so as to project toward the radially inner side of the opening forming portion OP. Therefore, in the embodiment, the radially innermost position of the non-spline portion NP of the axially extending portion 43 is prescribed by the projecting end (an end portion on the radially inner side) of the race opposing portion CP.

As illustrated in FIG. 4, the non-spline portion NP is configured such that the radially innermost position of the non-spline portion NP is on the radially outer side of the radially outermost position of the spline engagement portion A. Specifically, the race opposing portion CP is configured such that the radially innermost position of the race opposing portion CP is on the radially outer side of the bottom portion of spline grooves defined between the spline teeth 44 which are formed on the inner peripheral surface of the axially extending portion 43. In the embodiment, further, the race opposing portion CP is configured such that the radially innermost position of the race opposing portion CP is on the radially inner side of the radially center position of the rolling elements 63 included in the thrust bearing 60. In the embodiment, the race opposing portion CP is configured such that the radially innermost position of the race opposing portion CP is at about the same radial position as that of the bottom portion of the spline grooves between the spline teeth 44 which are adjacent to each other and slightly on the radially outer side of the bottom portion. The first race member 61 of the thrust bearing 60, which is disposed facing the race opposing portion CP (disposed in abutment with the inner peripheral surface 46a of the protruding portion 46), is configured such that the inner peripheral surface of the first race member 61 is positioned at about the same radial position as the inner peripheral surface of the tubular shaft member 3.

Oil injected radially from the supply-side opening portion 25 is received in a meeting region of the tubular shaft member 3, the axially extending portion 43 of the second carrier case 40, and the thrust bearing 60. In the embodiment, an oil receiving portion OR in a groove shape that extends in the circumferential direction is formed by the tubular shaft member 3, the non-spline portion NP of the axially extending portion 43, and the first race member 61 of the thrust bearing 60. Specifically, the oil receiving portion OR having a predetermined depth is formed by an axial end surface of the tubular shaft member 3, the bottom surface and the pair of side surfaces which define the circumferential groove portion 45, the inner peripheral surface of the race opposing portion CP, and an axial end surface of the first race member 61 that opposes the axially opposing surface 43a. In this way, in the embodiment, the circumferential groove portion 45 which is formed in the opening forming portion OP of the axially extending portion 43 also constitutes a part of the oil receiving portion OR. The oil receiving portion OR is formed to extend annularly continuously in the circumferential direction. In the example, the depth of the oil receiving portion OR is equal to or more than half the radial width of the first race member 61.

As illustrated in FIG. 3, oil not received by the oil receiving portion OR passes through the in-carrier oil passage 51 which is formed in the second carrier CA2 to be led to the pinion bearing 58 which is disposed at the support portion of the second carrier CA2 for the second pinion P2. The in-carrier oil passage 51 includes the radial oil passage 52 which extends linearly along the radial direction in the second support plate portion 42 of the second carrier case

40, and an axial oil passage 53 that extends linearly along the axial direction L in the carrier shaft 49. In the embodiment, the in-carrier oil passage 51 corresponds to the "guide oil passage".

As illustrated in FIG. 4, the inside opening portion 55 which is an opening portion of the radial oil passage 52 on the radially inner side is formed in the non-spline portion NP of the axially extending portion 43. In the embodiment, the inside opening portion 55 is formed in the bottom surface of the circumferential groove portion 45 which is formed in the opening forming portion OP of the axially extending portion 43 between the spline portion SP and the race opposing portion CP in the axial direction L. An oil hole 56 that communicates between the axial oil passage 53 and the outer peripheral surface of the carrier shaft 49 is formed at a predetermined position (in the example, the center position in the axial direction L) of the carrier shaft 49. The oil hole 56 is formed to extend linearly along the radial direction.

As described above, oil supplied from the in-shaft oil passage 21 in the power transfer shaft 2 is injected radially from the supply-side opening portion 25, and received by the oil receiving portion OR which is formed by the tubular shaft member 3, the non-spline portion NP of the axially extending portion 43, and the first race member 61 of the thrust bearing 60. After that, the oil is passed from the inside opening portion 55 through the in-carrier oil passage 51, led to the opening portion (outer opening portion) on the radially outer side of the oil hole 56, and supplied to the pinion bearing 58 which is disposed at the support portion for the second pinion P2. In this way, the pinion bearing 58 can be lubricated well.

Figure 5:
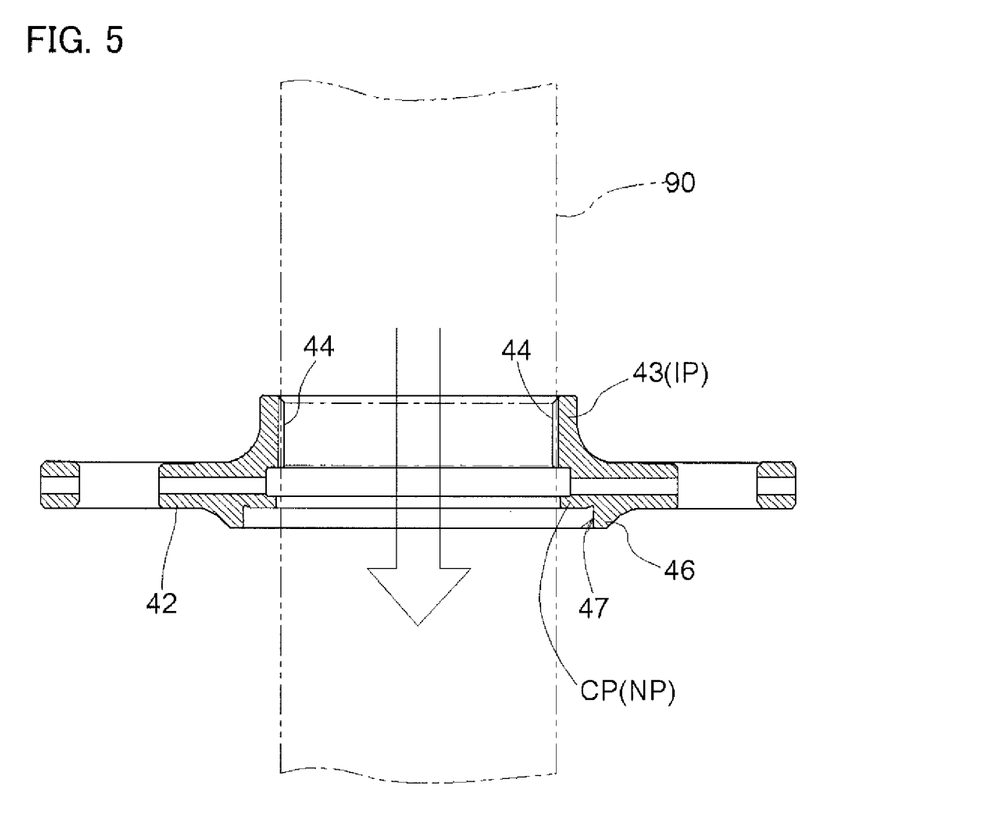
FIG. 5 is a schematic view illustrating a method of processing a spline engagement portion of a carrier case.

In the embodiment, as discussed above, the non-spline portion NP of the axially extending portion 43 is configured such that the radially innermost position of the non-spline portion NP is on the radially outer side of the radially outermost position of the spline engagement portion A. Therefore, the spline portion SP (specifically, the spline teeth 44) of the axially extending portion 43 can be formed by broaching. That is, as illustrated in FIG. 5, a broaching jig 90 for processing can penetrate the axially extending portion 43 of the second carrier case 40 over the entire region in the axial direction L to apply broaching without causing interference with the non-spline portion NP. Hence, with the configuration according to the embodiment, the plurality of spline teeth 44 can be formed collectively in contrast to the configuration according to the related art illustrated in FIG. 6 with which it is necessary to form the spline teeth 44 individually one by one by shaping, which makes it possible to significantly improve productivity.

In this case, the radially innermost position of the non-spline portion NP of the axially extending portion 43 is on the radially outer side of the radially outermost position of the spline engagement portion A. Therefore, the circumferential groove portion 45 is relatively shallow (see FIG. 4 etc.). Even in this case, however, the oil receiving portion OR is formed by the tubular shaft member 3, the non-spline portion NP of the axially extending portion 43, and the first race member 61 of the thrust bearing 60 with the circumferential groove portion 45 included in a part of the oil receiving portion OR. Therefore, oil supplied from the in-shaft oil passage 21 can be received appropriately and sufficiently by the oil receiving portion OR which has a certain depth. Hence, the pinion bearing 58 can be securely lubricated well.

In addition, the first race member 61 is fixed to the stepped portion 47 of the second carrier case 40 with the outer peripheral surface of the first race member 61 and the inner peripheral surface 46a of the stepped portion 47 abutting against each other. In addition, the first race member 61 is fixed on the radially inner side of the protruding portion 46 in the state of opposing the axial end surface (axially opposing surface 43a) of the race opposing portion CP of the axially extending portion 43 via a minute clearance (in the state of being able to abut against the axial end surface upon application of a minute thrust load). The radially innermost position of the race opposing portion CP is on the radially inner side of the radially center position of the rolling elements 63 of the thrust bearing 60. Therefore, the first race member 61 can be stably fixed with respect to the second carrier case 40, and a thrust load transferred via the thrust bearing 60 can be stably supported by the race opposing portion CP.

Other Embodiments

Other embodiments of the speed change device will be described. A configuration disclosed in each of the following embodiments may be applied in combination with a configuration disclosed in any other embodiment unless any contradiction occurs.

(1) In the embodiment described above, the second carrier case 40 (second support plate portion 42) is provided with the protruding portion 46 to form the stepped portion 47 which is configured to receive and support the first race member 61. However, embodiments disclosed herein are not limited thereto. For example, such a protruding portion 46 may not be provided, and the stepped portion 47 may be formed by using the second support plate portion 42 which has a sufficient thickness and cutting away a part of the second support plate portion 42.

(2) In the embodiment described above, the radially innermost position of the race opposing portion CP of the axially extending portion 43 is on the radially inner side of the radially center position of the rolling elements 63 included in the thrust bearing 60. However, embodiments of the present invention are not limited thereto. For example, the radially innermost position of the race opposing portion CP may be on the radially outer side with respect to the radially center position of the rolling elements 63 in such a range that support for the thrust bearing 60 is not excessively unstable.

(3) In the embodiment described above, the inside opening portion 55 of the in-carrier oil passage 51 (radial oil passage 52) is formed in the bottom surface of the circumferential groove portion 45. However, embodiments disclosed herein are not limited thereto. For example, the inside opening portion 55 may be formed in either of the side surfaces of the circumferential groove portion 45, or may be formed in the race opposing portion CP of the axially extending portion 43.

(4) In the embodiment described above, the circumferential groove portion 45 in a rectangular cross-sectional shape is formed continuously in the circumferential direction. However, embodiments disclosed herein are not limited thereto. For example, the circumferential groove portion 45 may be formed in a trapezoidal cross-sectional shape, a triangular cross-sectional shape, or the like. In addition, the circumferential groove portion 45 may be formed intermittently in the circumferential direction. The circumferential groove portion 45 may not necessarily be provided.

(5) In the embodiment described above, the first race member 61 is formed in a rectangular sectional shape. However, embodiments disclosed herein are not limited thereto. For example, the first race member 61 may be formed in an L-shape in section that extends along the axially opposing surface 43a and the inner peripheral surface 46a of the protruding portion 46 which constitute the stepped portion 47.

(6) In the embodiment described above, the axial oil passage 22 which constitutes the in-shaft oil passage 21 extends linearly along the axial direction L, and the radial oil passage 23 extends linearly along the radial direction. However, embodiments disclosed herein are not limited thereto. For example, at least one of the axial oil passage 22 and the radial oil passage 23 may be configured to extend along a direction that intersects the corresponding direction. In addition, at least one of the axial oil passage 22 and the radial oil passage 23 may be formed to be bent at a predetermined position.

(7) In the embodiment described above, the axial oil passage 53 which constitutes the in-carrier oil passage 51 extends linearly along the axial direction L, and the radial oil passage 52 and the oil hole 56 extend linearly along the radial direction. However, embodiments disclosed herein are not limited thereto. For example, at least one of the radial oil passage 52, the axial oil passage 53, and the oil hole 56 may be configured to extend along a direction that intersects the corresponding direction. In addition, at least one of the radial oil passage 52, the axial oil passage 53, and the oil hole 56 may be formed to be bent at a predetermined position.

(8) In the embodiment described above, the lubricating structure for the pinion bearing which utilizes the oil receiving portion OR is applied to the second planetary gear mechanism PG2. However, embodiments disclosed herein are not limited thereto. For example, a similar lubricating structure may be applied to the first planetary gear mechanism PG1, and in the case where the speed change device 1 further includes an additional planetary gear mechanism, a similar lubricating structure may be applied to the additional planetary gear mechanism.

(9) In the embodiment described above, the focus is mainly assumed to be applied to a speed change device provided in a vehicle drive device mounted on an FF (front-engine front-drive) vehicle. However, embodiments are not limited thereto. For example, embodiments may likewise be applied to a speed change device provided in a vehicle drive device mounted on an FR (front-engine rear-drive) vehicle or a 4WD (four-wheel-drive) vehicle.

(10) In the embodiment described above, the focus is applied to a speed change device provided in a vehicle drive device mounted on a two-motor series/parallel type hybrid vehicle. However, embodiments are not limited thereto. For example, embodiments may be applied to a speed change device provided in any vehicle drive device for a hybrid vehicle of a different type such as a one-motor parallel type, an engine vehicle, an electric vehicle, or the like. In addition, embodiments may be applied to any speed change device that includes a planetary gear mechanism that has a carrier, besides speed change devices for vehicles.

(11) Also regarding other configurations, the embodiment disclosed herein is illustrative in all respects, and it should be understood that the scope is not limited thereto. It would be easy for a person skilled in the art to understand that the present invention may be altered as appropriate without departing from the scope and spirit of the present invention. Thus, it is a matter of course that other embodiments obtained by altering the present invention without departing from the scope and spirit of the present invention are also included in the scope of the present invention.

Overview of Embodiment

To sum up what has been described above, the speed change device according to the present disclosure preferably includes the following configurations.

[1]

A speed change device (1) including a power transfer shaft (2), a tubular shaft member (3) disposed on a radially outer side of the power transfer shaft (2) coaxially with the power transfer shaft (2), and a planetary gear mechanism (PG2) having a carrier (CA2) that rotatably supports a pinion (P2) and disposed on a radially outer side of the tubular shaft member (3) coaxially with the tubular shaft member (3), in which:

an in-shaft oil passage (21) that communicates with a supply-side opening portion (25) that opens in an outer peripheral surface of the power transfer shaft (2) is formed in the power transfer shaft (2);

a radially inner portion (IP) of the carrier (CA2) that faces toward a radially inner side and that is provided over a predetermined axial range is disposed so as to oppose the supply-side opening portion (25), and a part of the radially inner portion (IP) and a part of an outer peripheral surface of the tubular shaft member (3) are coupled to each other by a spline engagement portion (A);

an inside opening portion (55) of a guide oil passage (51) that leads oil supplied from the supply-side opening portion (25) to a support portion of the carrier (CA2) for the pinion (P2) is formed in a non-spline portion (NP) which is a portion of the radially inner portion (IP) excluding the spline engagement portion (A);

a thrust bearing (60) that receives an axial load is disposed on an opposite side of the inside opening portion (55) from the spline engagement portion (A) in an axial direction (L), and a target race member (61) which is one of race members of the thrust bearing (60) abuts against the carrier (CA2);

a radially innermost position of the non-spline portion (NP) is on a radially outer side of a radially outermost position of the spline engagement portion (A); and an oil receiving portion (OR) in a groove shape that extends in a circumferential direction is formed by the tubular shaft member (3), the non-spline portion (NP), and the target race member (61).

With the configuration, oil supplied from the supply-side opening portion of the power transfer shaft through the in-shaft oil passage can be received by the oil receiving portion which is formed utilizing a part (the non-spline portion) of the radially inner portion of the carrier, and the oil can be led to the support portion of the carrier for the pinion.

Since the radially innermost position of the non-spline portion of the carrier is on the radially outer side of the radially outermost position of the spline engagement portion, there is caused no problem due to interference with the non-spline portion, and the spline engagement portion can be formed by broaching. Hence, productivity can be significantly improved compared to a case where it is necessary to perform shaping as in the related art.

In addition, even in the case where the non-spline portion is positioned on the radially outer side with respect to the spline engagement portion, oil supplied from the supply-side opening portion can be sufficiently received by forming the oil receiving portion utilizing the target race member which is one of the race members of the thrust bearing. Hence, the support portion of the carrier for the pinion can be securely lubricated well.

[2]

The carrier (CA2) has a stepped portion (47) that includes an axially opposing surface (43a) that faces toward the target race member (61) in the axial direction (L) and an inner peripheral surface (46a) that faces toward the radially inner side; and the target race member (61) is attached to the carrier (CA2) with an outer peripheral surface of the target race member (61) and the inner peripheral surface (46a) of the stepped portion (47) abutting against each other.

With the configuration, the target race member can be stably fixed to the carrier with the outer peripheral surface of the target race member and the inner peripheral surface of the stepped portion abutting against each other.

[3]

A radially innermost position of a race opposing portion (CP) of the carrier (CA2), the race opposing portion (CP) disposed facing the target race member (61), is on the radially inner side of a radially center position of a rolling element (63) included in the thrust bearing (60).

With the configuration, a thrust load transferred via the thrust bearing can be stably supported by the race opposing portion of the carrier.

[4]

A circumferential groove portion (45) that is defined in a recessed shape, that extends in the circumferential direction, and that constitutes a part of the oil receiving portion (OR) is formed in the radially inner portion (IP) between the spline engagement portion (A) and the race opposing portion (CP) in the axial direction (L).

With the configuration, oil received by the oil receiving portion can be easily led to the guide oil passage, as a result of which the oil can be easily led to the support portion of the carrier for the pinion.

[5]

The target race member (61) is formed in a rectangular sectional shape.

With the configuration, the target race member and a surface of the carrier for receiving the target race member can be easily lubricated. Hence, even if the target race member is rotated in an accompanying manner, it is possible to suppress damage to the surface of the carrier for receiving the target race member due to friction.

It is only necessary that the speed change device according to the present disclosure should achieve at least one of the effects discussed above.

DESCRIPTION OF THE REFERENCE NUMERALS

1 SPEED CHANGE DEVICE
2 POWER TRANSFER SHAFT
3 TUBULAR SHAFT MEMBER
21 IN-SHAFT OIL PASSAGE
25 SUPPLY-SIDE OPENING PORTION
43 AXIALLY EXTENDING PORTION
43a AXIALLY OPPOSING SURFACE
45 CIRCUMFERENTIAL GROOVE PORTION
46a INNER PERIPHERAL SURFACE
47 STEPPED PORTION
51 IN-CARRIER OIL PASSAGE (GUIDE OIL PASSAGE)
55 INSIDE OPENING PORTION
58 PINION BEARING
60 THRUST BEARING
61 FIRST RACE MEMBER (TARGET RACE MEMBER)
63 ROLLING ELEMENT
100 VEHICLE DRIVE DEVICE
PG2 SECOND PLANETARY GEAR MECHANISM (PLANETARY GEAR MECHANISM)
CA2 SECOND CARRIER (CARRIER)
P2 SECOND PINION (PINION)
L AXIAL DIRECTION
A SPLINE ENGAGEMENT PORTION
IP RADIALLY INNER PORTION
NP NON-SPLINE PORTION
CP RACE OPPOSING PORTION
OR OIL RECEIVING PORTION

The invention claimed is:

1. A speed change device comprising a power transfer shaft, a tubular shaft member disposed on a radially outer side of the power transfer shaft coaxially with the power transfer shaft, and a planetary gear mechanism having a carrier that rotatably supports a pinion and disposed on a radially outer side of the tubular shaft member coaxially with the tubular shaft member, wherein:
  an in-shaft oil passage that communicates with a supply-side opening portion that opens in an outer peripheral surface of the power transfer shaft is formed in the power transfer shaft;
  a radially inner portion of the carrier, which faces toward a radially inner side and is provided over a predetermined axial range, is disposed so as to oppose the supply-side opening portion, and a part of the radially inner portion and a part of an outer peripheral surface of the tubular shaft member are coupled to each other by a spline engagement portion;
  an inside opening portion of a guide oil passage that leads oil supplied from the supply-side opening portion to a support portion of the carrier for the pinion is formed in a non-spline portion which is a portion of the radially inner portion excluding the spline engagement portion;
  a thrust bearing that receives an axial load is disposed on an opposite side of the inside opening portion from the spline engagement portion in an axial direction, and a target race member which is one of race members of the thrust bearing abuts against the carrier;
  a radially innermost position of the non-spline portion is on a radially outer side of a radially outermost position of the spline engagement portion; and
  an oil receiving portion in a groove shape that extends in a circumferential direction is formed by the tubular shaft member, the non-spline portion, and the target race member.

2. The speed change device according to claim 1, wherein:
  the carrier has a stepped portion that includes an axially opposing surface that faces toward the target race member in the axial direction and an inner peripheral surface that faces toward the radially inner side; and
  the target race member is attached to the carrier with an outer peripheral surface of the target race member and the inner peripheral surface of the stepped portion abutting against each other.

3. The speed change device according to claim 2, wherein a radically innermost position of a race opposing portion of the carrier, the race opposing portion disposed facing the target race member, is on the radically inner side of a radically center position of a rolling element included in the thrust bearing.

4. The speed change device according to claim 3, wherein a circumferential groove portion that is defined in a recessed shape, that extends in the circumferential direction, and that constitutes a part of the oil receiving portion is formed in the radially inner portion between the spline engagement portion and the race opposing portion in the axial direction.

5. The speed change device according to claim 3, wherein the target race member is formed in a rectangular sectional shape.

6. The speed change device according to claim 2, wherein the target race member is formed in a rectangular sectional shape.

7. The speed change device according to claim 1, wherein a radially innermost position of a race opposing portion of the carrier, the race opposing portion disposed facing the target race member, is on the radially inner side of a radially center position of a rolling element included in the thrust bearing.

8. The speed change device according to claim 7, wherein a circumferential groove portion that is defined in a recessed shape, that extends in the circumferential direction, and that constitutes a part of the oil receiving portion is formed in the radially inner portion between the spline engagement portion and the race opposing portion in the axial direction.

9. The speed change device according to claim 8, wherein the target race member is formed in a rectangular sectional shape.

10. The speed change device according to claim 7, wherein the target race member is formed in a rectangular sectional shape.

11. The speed change device according to claim 1, wherein the target race member is formed in a rectangular sectional shape.

* * * * *